3,360,497
POLYOLEFIN PIGMENT DISPERSION
George F. Jones and Vernon H. Ure, Glens Falls, N.Y., assignors to Hercules Incorporated, a corporation of Delaware
No Drawing. Filed Oct. 16, 1964, Ser. No. 404,211
19 Claims. (Cl. 260—41)

This application is a continuation-in-part of our copending application Ser. No. 161,298, filed Dec. 21, 1961, and now abandoned.

This invention relates to the production of pigment dispersions in polyolefins suitable for use in coloring multifilament fibers, fine denier monofilaments, films and other applications requiring pigment dispersion of a high degree.

Pigment dispersions in polyolefins are normally made by milling dry pigments, which exist as aggregates, into the molten polyolefin on a two-roll mill or in a Banbury mixer. Since polyolefins are poor wetting vehicles for pigments and do not have sufficient melt viscosity to develop suitable shear rates during the grinding operation, it is not practically possible to reduce the pigment aggregates to a sufficiently small size and produce pigment dispersions of really good quality in this manner. The presence of partly reduced pigment aggregates in the molten plastic cause plugging of screen packs during extrusion, and breakage of filaments during drawing, and loss of transparency and brilliancy in pigmented films and fibers.

In accordance with the present invention, a method is described which will produce pigment dispersions essentially free of pigment aggregates at relatively high pigment concentrations. Thus, it is possible to produce satisfactory pigmented polyolefin compositions by admixing these dispersions with a suitable amount of natural or uncolored polymer as in an extruder. Because the pigments in these compositions are in a highly dispersed state, the compositions perform satisfactorily in the melt spinning of the multifilament fibers, exhibiting almost no screen pack pressure build-up and permitting subsequent drawing of the fibers without breakage. When used to color polyolefin films, these products produce brilliant transparent films which are clearly superior to pigmented films produced from prior conventional pigment dispersions.

The high quality pigment dispersions of the invention are produced by first preparing an aqueous dispersion of the pigment in the presence of a suitable water-soluble or water-dispersible cationic or anionic surfactant, transferring the pigment in this form to a low molecular weight polyolefin dissolved in a solvent, adding sufficient high molecular weight polyolefin in powdered form, either prior to such transfer or subsequent thereto, to bring the pigment content to a desired level, removing water and solvent and then drying in conventional manner, and subjecting the dried product to high shear, as by passage through an extruder with a compounding screw or working on a two-roll mill. The material can then be pelletized, pulverized or granulated as may be desired.

The resultant product is a pigment dispersion comprised of pigment highly dispersed in a co-melted mixture of oil wetting agent, low molecular weight polyolefin and high molecular weight polyolefin, the term "oil wetting agent" meaning a material which is soluble or dispersible in low molecular weight polyolefin and capable of wetting out said dispersed pigment in the polyolefin. The type of polyolefin is determined by the nature of the high molecular weight polyolefin added during processing. Thus, it is possible to produce low-density polyethylene, high-density polyethylene, or other polyolefin pigment dispersions by proper choice of the powdered high molecular weight polyolefin.

Having described the invention generally, the following examples are given to illustrate specific embodiments thereof.

Example 1

One hundred pounds of phthalocyanine blue presscake containing 25 pounds of dry pigment was charged into a pebble mill with 3.75 pounds of 1-(2-hydroxyethyl)-2-n-heptadecenyl-2-imidazoline acetate and 12½ pounds of water. This mixture was ground for 40 hours and dumped. The product was a fluid aqueous dispersion of phthalocyanine blue whose particles were colloidal in character.

An agitated stainless steel tank was charged with 450 Imperial gallons of water, 40 pounds of mineral spirits and 25 pounds of low molecular weight polyethylene having a molecular weight of approximately 1500. This mixture was heated to 94° C. under agitation. The above pigmented dispersion was then added and the whole stirred to a homogeneous mixture. Fifty pounds of stabilized polypropylene flake (powder) having an average molecular weight from about 200,000 to about 250,000 was then added and allowed to thoroughly mix in. One and three-tenths pounds of 50% sodium hydroxide was then added and the batch checked for color transfer. The aqueous phase should be completely free of color at this point, and the pH value should be approximately 10. The pigmented phase should be in the form of small granules. Additional water was added at this stage to reduce the temperature to 50° C. The batch was then run out onto a screen where the bulk of the water was separated from it. The partly dewatered material was thoroughly washed with water at this point to remove extraneous salts. It was then dried by conventional means to produce 100 pounds of pigmented material containing 25% dry phthalocyanine blue. At this point the product was in the form of a coarse powder.

This material was extruded through a vented extruder fitted with a compounding screw and a strand die. The strands were pelletized. The pellets may be used directly or granulated by means of suitable equipment. The final product was a 25% phthalocyanine blue dispersion in polypropylene.

Example 2

Fifty pounds of cadmium yellow was charged into a suitable pebble mill with 50 pounds of water and 1.5 pounds of 1-(2-hydroxyethyl)-2-n-heptadecenyl-2-imidazoline acetate. The batch was ground for 40 hours and dumped. The product was a fluid aqueous dispersion of cadmium yellow whose particles were uniform and approximately 0.5 micron in size.

An agitated stainless steel tank was charged with 350 Imperial gallons of water, 30 pounds of mineral spirits and 20 pounds of low molecular weight polyethylene having a molecular weight of approximately 1500. This mixture was heated to 94° C. under agitation. The cadmium yellow dispersion described above was then added to the mixture and the whole stirred until homogeneous. Thirty pounds of stabilized polypropylene flake having an average molecular weight from about 200,000 to about 250,000 was then added and allowed to mix in. Five-tenths pound of 50% sodium hydroxide was then added. After a short stir, the batch was checked for color transfer from the aqueous phase to the nonaqueous phase. The aqueous phase should be completely free of color at this point, and the pH value should be approximately 10. The pigmented phase should be in the form of small granules. Additional water was added at this point to reduce the temperature to 50° C. The batch was run into a suitable screen box where it was filtered and washed. Drying and subsequent extrusion were carried out as in Example 1 to produce 100 pounds of 50% cadmium yellow dispersion in polypropylene.

*Example 3*

The procedure of Example 1 was followed except that 50 pounds of high-density polyethylene flake (powder) having an average molecular weight within the range from about 200,000 to about 300,000 was substituted for the stabilized polypropylene flake to produce a 25% phthalocyanine blue dispersion in high-density polyethylene.

*Example 4*

The procedure of Example 1 was followed except that 50 pounds of low-density polyethylene powder having an average molecular weight within the range from about 150,000 to about 200,000 was substituted for the stabilized polypropylene flake to produce a 25% phthalocyanine blue dispersion in low-density polyethylene.

*Example 5*

The procedure of Example 2 was followed except that 1.5 pounds of an alkyl oxazoline acetate in which the alkyl group has a minimum of seven carbon atoms was substituted for the imidazoline amine acetate to produce a 50% dispersion of cadmium yellow in polypropylene.

*Example 6*

The procedure of Example 1 was followed except that 25 pounds of a low molecular weight amorphous polypropylene having an average molecular weight of about 30,000 was substituted for the low molecular weight polyethylene to produce a 25% phthalocyanine blue dispersion in polypropylene.

*Example 7*

A dispersion of phthalocyanine green pigment was prepared following the procedure of Example 1 except that in place of the imidazoline acetate there was used a water-dispersible acetate salt of a polyethoxylated amine having the following structural formula:

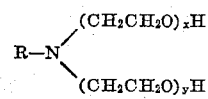

where R is a stearyl group containing 18 carbon atoms, and $x+y$ is 2. This material produced a good dispersion of phthalocyanine green which flushed well into the low molecular weight polyolefin when neutralized with sodium hydroxide.

*Example 8*

The procedure of Example 7 was followed utilizing the acetate salt of a polyethoxylated amine of the indicated formula in which R is a radical derived from soybean fatty acids containing approximately 15 carbon atoms, and $x+y$ is 5. This material produced a good dispersion similar to the results in Example 7. When neutralized with caustic, this dispersion gave a good flushing in the low molecular weight polyolefin. A final pigment dispersion was comparable to that of Examples 1 and 7.

*Example 9*

The procedure of Example 7 was followed utilizing the acetate salt of a polyethoxylated amine of the indicated formula in which R is a stearyl group containing approximately 18 carbon atoms and $x+y$ is 10. The free base of this material is water-soluble. This material, as the acetate salt, produced a good dispersion of the pigment, but the pigment did not flush when the amine salt was neutralized with sodium hydroxide to form the free base.

*Example 10*

The procedure of Example 9 was followed and, after neutralization with alkali, 10% of an alkyl imidazoline was added to the mixture. Immediate flushing of the pigment was obtained.

*Example 11*

A dispersion of phthalocyanine green pigment was prepared following the procedure of Example 1 except that in place of the imidazoline acetate there was used the water-dispersible acetic acid salt of Amine 750 (technical grade of dehydroabietylamine). This material produced a good dispersion of phthalocyanine green which flushed well into the low molecular weight polyolefin when neutralized with sodium hydroxide. A final pigmen dispersion was produced comparable to that of Examples 1 and 7.

*Example 12*

A dispersion of phthalocyanine blue pigment was prepared following the procedure of Example 1 except that in place of the imidazoline acetate there was used a like quantity of the acetic acid salt of a commercially available tertiary amine consisting primarily of a mixture of tripalmityl, tristearyl and trilinoleyl amines. This material produced a good dispersion of phthalocyanine blue which flushed well into the low molecular weight polyolefin when neutralized with sodium hydroxide. An excellent final pigment dispersion was produced.

*Example 13*

A dipersion of phthalocyanine green was prepared following the procedure of Example 1 except that in place of the imidazoline acetate there was used a water-dispersible acetic acid salt of a polyethoxylated amine having the following formula:

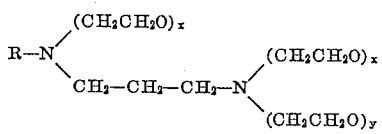

where R is a mixed alkyl group containing 12–18 carbon atoms (coconut oil), and $x+y$ is 3. This material produced a good dispersion of phthalocyanine green which flushed well into the low molecular weight polyolefin when neutralized with sodium hydroxide. The final pigment dispersion produced was comparable to that of Example 1 or 7.

*Example 14*

A dispersion of phthalocyanine green pigment was prepared following the procedure of Example 1 except that in place of the imidazoline acetate there was used five pounds of sodium lauryl sulfate. This material produced a good dispersion of phthalocyanine green which flushed well into the low molecular weight polyethylene when treated with a like amount of dehydroabietylamine acetate. An excellent final pigment dispersion was obtained comparable to that of Example 1 or 7.

*Example 15*

A dispersion of cadmium yellow was prepared following the procedure of Example 2 except that 2.5 pounds of the sodium sulfonate of the condensation product of nonyl phenol and 5 moles of ethylene oxide was substituted for the imidazoline acetate. A good pigment dispersion was obtained which flushed readily into the low molecular weight polyethylene when treated with 2.5 pounds of imidazoline acetate. A good final pigment dispersion in polyolefin was produced comparable to that of Example 2.

*Example 16*

A dispersion of phthalocyanine blue was prepared following the procedure of Example 1 except that 4 pounds of sodium dinaphthyl methane disulfonate was used in place of the imidazoline acetate as a dispersant. An excellent water dispersion was obtained by the above method. When a like amount of dehydroabietylamine acetate was added, no flushing of the pigment occurred into the low molecular weight polyethylene even after prolonged stirring.

*Example 17*

A dispersion of phthalocyanine blue was prepared following the procedure of Example 1 except that 5 pounds of dehydroabietylamine lactate was used in place of the imidazoline acetate. This material produced a good dispersion of phthalocyanine blue which flushed well into the low molecular weight polyethylene when neutralized with sodium hydroxide. A final dispersion was produced comparable to those of Examples 1 and 7.

*Example 18*

A dispersion of phthalocyanine green was prepared following the procedure of Example 1 except that 4.75 pounds of dehydroabietylamine hydrochloride was used in place of the imidazoline acetate. This material produced an excellent aqueous dispersion of phthalocyanine green which flushed well into the low molecular weight polyethylene when neutralized with sodium hydroxide. A final dispersion was produced comparable to those of Examples 1 and 7.

*Example 19*

A dispersion of carbon black was prepared following the procedure of Example 1 except that 4.75 pounds of imidazoline hydrochloride was used in place of the imidazoline acetate. A good aqueous dispersion of the pigment was obtained which flushed well into the low molecular weight polyethylene when neutralized with sodium hydroxide. A final dispersion was produced comparable to that of Example 1.

*Example 20*

A phthalocyanine blue dispersion was prepared following the procedure of Example 1 except that 5 pounds of imidazoline sulfate was used in place of the imidazoline acetate. A good aqueous dispersion was produced which flushed well into the low molecular weight polyethylene when neutralized with sodium hydroxide. A final dispersion was produced which was comparable to those of Examples 1 and 7.

*Example 21*

A cadmium yellow dispersion was prepared following the procedure of Example 2 except that 1.5 pounds of imidazoline phosphate was used in place of the imidazoline acetate. A good aqueous dispersion of the pigment was produced which flushed readily into the low molecular weight polyethylene when neutralized with sodium hydroxide. A final dispersion was produced comparable to that of Example 2.

*Example 22*

A phthalocyanine blue dispersion was prepared following the procedure of Example 1 except that 3.75 pounds of Ethoquad C-12, a quaternary ammonium chloride derived from the adduct of coconut oil fatty acid amine and two (2) moles of ethylene oxide, was added. A good pigment dispersion was obtained which flushed readily when treated with 2.5 pounds of sodium lauryl sulfate dissolved in a suitable amount of water. The final pigment dispersion was comparable to that of Example 1.

*Example 23*

A carbon black dispersion was prepared following the procedure of Example 1. In place of converting the imidazoline acetate to a free base with sodium hydroxide there was added 3.75 pounds of sodium lauryl sulfate dissolved in 5 gallons of water. A good flushing was obtained and the final dispersion produced was comparable to those of Examples 1 and 7.

*Example 24*

A dispersion of phthalocyanine green was prepared following the procedure of Example 1 except that in place of the imidazoline acetate there was used a dehydroabietylamine acetate (the acetate of Amine 750 as set forth in Example 11). This material was flushed by the addition of 3.75 pounds of sodium oleate dissolved in a suitable amount of water instead of neutralizing with sodium hydroxide. A good flushing was obtained and the final pigment dispersion produced was comparable to those of Examples 1 and 7.

As illustrated in the examples, the process of the invention involves the following steps: (1) preparation of either a cationic or anionic aqueous pigment dispersion of colloidal dimensions, (2) transfer or flushing of the product from (1) to a solution of low molecular weight polyolefin, i.e., polyethylene or polypropylene, in a suitable solvent, sufficient high molecular weight polyolefin being added before or after flushing, and preferably before flushing, to bring the pigment content to the desired level, (3) removing any solvent or water still remaining, and (4) subjecting the resulting product to high shear by any suitable means.

Preparation of the aqueous dispersion in Step 1 can be accomplished by pebble milling, grinding in a colloid mill, or the like, a mixture of pigment, water and suitable cationic or anionic surfactant to produce a colloidal free-flowing aqueous dispersion of the pigment. Either dried pigment and water or a pigment presscake may be used as the pigment source. Presscakes are preferred where possible as these avoid the aggregation that normally occurs during drying of the pigment. Calcined pigments such as titanium dioxide, cadmium yellows and reds are not available in this form and must be used as dried pigments. Organic pigments such as pthalocyanine blue and green, etc., are available in a presscake form and are advantageously used in this form. The amount of water is not critical, the practical requirement being that sufficient water be present to permit satisfactory processing.

The cationic and anionic surfactants contemplated for use herein should have sufficient heat stability to withstand subsequent processing temperatures without decomposition. In addition, if not per se water-soluble or water-dispersible, they must be capable of forming water-soluble or water-dispersible compounds or materials, e.g., salts which will exert a peptizing action on the pigment in water. And, finally, they must be convertible to water-insoluble, oil-soluble or oil-dispersible compounds or materials such as, for example, the free base. The terms "oil-soluble" and "oil-dispersible," as used herein, mean that the compounds or materials are soluble or dispersible in polyolefins.

In general, any amine, including primary, secondary and tertiary amines or quaternary ammonium compounds having the requisite heat stability can be used herein. Thus, tertiary amines properly substituted to fulfill the indicated requirements are very satisfactory for the purpose. Typical of the substituted tertiary amines which can be used herein are heterocyclic tertiary amines such as alkyl imidazolines and oxazolines. Other substituted tertiary amines which can be used are polyethoxylated amines having the following structural formula:

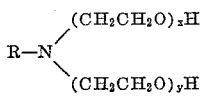

where R is an organic radical, i.e., a fatty acid radical containing from about 12 to about 20 carbon atoms, and $x$ and $y$ are integers whose sum may vary from 2 to about 6 or 7 as long as the free base is water-insoluble.

Preferred compounds of this type for use herein are the heterocyclic tertiary amines. These amines exhibit excellent wetting power and solubility in hydrocarbon solvents, have good heat stability and low water solubility. They are capable of forming water-soluble salts with various acids. The acetate salts of these materials are excellent dispersants for pigments in aqueous media. The chain length of the substituted alkyl group is critical only as it affects the water solubility of the free base and effectiveness of the salt as a dispersant. In general, alkyl chain lengths from about 7 carbon atoms to about 19 carbon atoms are operative, the limiting factors being the water solubility of the free base in the shorter chain lengths and the water insolubility of the salts with resultant reduced effectiveness as surfactants in the longer chain lengths beyond 19 carbon atoms. Preferred length of the alkyl chain is from about 11 to about 17 carbon atoms.

One of the preferred imidazolines is 1-(2-hydroxyethyl)-2-n-heptadecenyl-2-imidazoline. With inorganic pigments such as $TiO_2$, cadmium yellow, cadmium red, etc., about 3% of the above compound as the acetate salt based on the dried pigment is sufficient to produce a satisfactory aqueous pigment dispersion. With organic pigments where the ultimate particle size is much smaller, 15 or 20% of the above surfactant may be required based on the dried pigment.

A suitable primary amine having the desired heat stability for use herein is dehydroabietylamine which has the following structural formula:

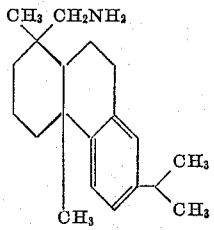

The above compound is characterized by its water insolubility, excellent solubility in most common organic solvents and the strong peptizing action exerted by its water-soluble and/or water-dispersible salts on various pigments.

Typical of the quaternary ammonium compounds suitable for use herein are the quaternary ammonium chlorides derived from adducts of $C_{12}$ to $C_{18}$ fatty acid amines and from about 2 to about 15 moles of ethylene oxide, e.g., Ethoquad C12, a quaternary ammonium chloride derived from the adduct of coconut oil fatty acid amine and two moles of ethylene oxide. Other suitable quaternary compounds include those containing a cyclic or aromatic structure such as lauryl pyridinium chloride and lauryl imidazolinium chloride. Such compounds appear to have better heat stability than quaternaries composed of alkyl groups alone.

The anionic surfactants contemplated for use herein are those which will peptize and flush inorganics, organics and carbon blacks satisfactorily when used with an amine salt, as hereinafter described, as a precipitant. One of the preferred anionic surfactants is the sodium sulfate derivative of 7-ethyl-2-methyl-4-undecanol, sodium lauryl sulfate. With inorganic pigments about 5% is sufficient to produce a satisfactory aqueous pigment dispersion. With organic pigments and carbon black about 30% is sufficient. The amount varies with the individual pigments but generally amounts ranging from about 3% to 30% by weight will usually be satisfactory.

Another satisfactory anionic surfactant is sodium butyl naphthylene sulfonate. This material is an effective pigment dispersant in aqueous media and reacts with long-chain amines to produce water-insoluble complexes which are oil-soluble or oil-dispersible. The methyl homolog, however, is not satisfactory as it appears to lack the necessary oil solubility or dispersibility.

Still other anionic materials which are suitable for this purpose are the sodium sulfonates of the condensation products of alkylphenols and up to five (5) moles of ethylene oxide, e.g., the sodium sulfonate of the condensation product of nonylphenol and five (5) moles of ethylene oxide. This material produces fluid aqueous dispersions of most pigments when used in amounts ranging from 5% to 30% based on the dry pigment. When precipitated by a long chain amine salt, it causes the pigment to flush readily into the nonaqueous phase.

Additional examples of satisfactory anionic surfactants which will peptize and flush inorganic, organics and carbon blacks satisfactorily when used with an amine salt as precipitant are Tergitol 4 (the sodium sulfate derivative of 7-ethyl-2-methyl-4-undecanol), Igepon AC–78 (a product having the formula: R—$COOC_2H_4SO_3Na$, where R denotes the nuclei of coconut oil fatty acids), Triton GR–5 and Triton X–200 (dioctyl sodium sulfosuccinate and a product having the formula R—$C_6H_4OC_2H_4OC_2H_4SO_3Na$ where R is an octyl or nonyl group, respectively), Protenol NT (triethanolamine salt of n-acylated polypeptide), Maypon 4C Spec. (the potassium salt of the peptide of coconut oil fatty amine condensate), Sarkosyl NL (sodium N-lauroyl sarcosinate), Duponol WAT (triethanol ammonium lauryl sulfate), Emcol P1059 (the amine salt of dodecyl benzene sulfonic acid), Aerosol 22 (tetrasodium-N-(1,2-dicarboxyethyl)-N-octadodecyl sulfosuccinamate), Igepon TC–42 (sodium-N-methyl-N tall oil acid taurate) and Decerosol OS (the dioctyl ester of sodium sulfosuccinic acid).

The amount of surfactant to use in a particular case will vary with a number of factors including the type of surfactant, the type of pigment, the type and amount of polyolefin and so on. In most cases, amounts from about 2% to about 25% by weight, based on the weight of pigment, will usually be satisfactory, the specific amount being readily determinable by one skilled in the art.

As previously indicated herein, if the surfactant per se is not water-soluble or water-dispersible it must be convertible to a water-soluble or water-dispersible material which will exert a peptizing action on the pigment in water. In the case of the cationic surfactants, except the quaternary ammonium compounds, this is advantageously accomplished by converting the water-insoluble free base to a water-soluble amine salt. Any salt of the particular surfactant which is water-soluble or water-dispersible, e.g., the hydrochloride, the sulfate, the lactate, the phosphate, the acetate and so on, can be used.

Step 2 of this invention involves a transfer or flushing of the dispersed pigment from the aqueous media in which it was originally prepared to a solution of low molecular weight polyolefin dissolved in a solvent.

This step of the process can be carried out in any suitable apparatus such as an agitated tank fitted with suitable steam and water lines. Sufficient wtaer is added to the tank to dilute the pigment dispersion subsequently added, to a point where it is possible to maintain adequate fluidity throughout the process. A pigment concentration from about 0.4% to about 0.6% will usually be sufficient to maintain this fluidity. This, however, is not critical and can be varied from less than about 0.1% to about 1% or more. Low molecular weight polyethylene and solvent, for example, hydrocarbon solvent, are added to the water and the mixture heated. The temperature of heating is not critical during the flushing operation and may range from about 40° C. to about 100° C. A preferred temperature range for ideal conditions is from about 90° C. to about 100° C. The previously prepared cationic pigment dispersion is then added preferably along with the required amount of high molecular weight polyolefin in powdered form although this can be added after the transfer or flushing, if desired. After a few minutes' stirring, a homogeneous fluid mixture is obtained. The low molecular weight polyolefin hydrocarbon solution is dispersed throughout the mass by the surfactant present in the pigment dispersion.

At this point, no transfer of the pigment to the nonaqueous phase has occurred. Portions of the mixture spotted on filter paper show no separation of components and appear as a uniformly colored mass. Transfer or flushing of the pigment to the nonaqueous phase is now accomplished by precipitating the pigment dispersant as either an oil-soluble or oil-dispersible compound. In the case of cationic dispersions this is accomplished by treatment of the dispersion with an alkali to convert the cationic surfactant to a water-insoluble, oil-soluble free base or through use of a suitable anionic material which will combine with the cationic surfactant to form a water-insoluble, oil-soluble or oil-dispersible compound. While the preferred alkali for use herein is sodium hydroxide, other alkalis such as sodium carbonate, potassium hydroxide, potassium carbonate, ammonium hydroxide and water-soluble organic bases such as triethanolamine or morpholine can be used. Any anionic material which will chemically react with the cationic surfactant to form a water-insoluble, oil-soluble or oil-dispersible compound can be used herein. Thus, any of the anionic surfactants listed hereinabove as suitable for forming the initial pigment dispersions in accordance with the invention can be used provided they have the required reactivity with the cationic surfactant. Other anionic surfactants which are satisfactory for use as precipitants, but which are not considered to be particularly good pigment dispersants, are sodium oleate, sodium laurate, sodium palmitate, sodium stearate, sulfonated castor oil, sulfonated petroleum, sulfonated tall oil and sodium naphthenate.

In the case of the anionic dispersions, precipitation of the pigment dispersant can be accomplished by adding to the dispersion a water-soluble salt of any of the cationic amine surfactants described herein as suitable for forming the initial pigment dispersions and which will react with the amionic surfactant to produce a water-insoluble, oil-soluble or oil-dispersible compound. It is not necessary, however, that the cationic surfactant utilized for precipitating the anionic surfactant be operable as an aqueous pigment dispersant in its own right. On the contrary, all that is necessary is that the cationic surfactant be capable of reacting with the anionic surfactant to form a water-insoluble, oil-soluble or oil-dispersible compound and any cationic surfactant which will meet this requirement is satisfactory for use herein. Some cationic materials which fall in this category are primary and secondary fatty amines such as coconut amine, soybean oil amine, hydrogenated tallow amine, dihydrogenated tallow amine and oleyl amine.

Sufficient precipitant (alkali, e.g., sodium hydroxide or suitable anionic surfactant in the case of cationic dispersions, or suitable heat stable amine salt in the case of anionic dispersions) is added to convert the dispersant to a water-insoluble, oil-soluble, or oil-dispersible compound. Pigment transfer to the nonaqueous phase immediately occurs, and the mixture separates into two distinct phases comprised of (1) a colorless aqueous phase consisting of a dilute solution of, e.g., sodium acetate, and (2) a colored nonaqueous phase in the form of small granules consisting of a mixture of pigment, low molecular weight polyolefin dissolved in a hydrocarbon solvent, oil-soluble or oil-dispersible wetting agent, in the same solvent and powdered high molecular weight polyolefin. The colored granules are fairly firm and appear to be quite uniformly colored. When flushing appears to be complete, the temperature is reduced to about 50° C. through addition of cold water or ice.

The amount of low molecular weight polyolefin used in Step 2 has a direct relationship to the particle size of the pigment involved. Thus, large particle size pigments such as titanium dioxide and cadmium yellows and reds require less than the small particle size pigments such as phthalocyanine blue and green do. Large particle size inorganic pigments usually require a maximum of about 20% of, for example, polyethylene based on the pigment, while the smaller particle organics usually require about 100% polyethylene based on the pigment. In general, the amount of low molecular weight polyolefin required can vary from about 10% to about 125%. Increased amounts do not show further quality improvement, while decreased amounts produce gradual decline in dispersion quality as the amount is reduced. The prime function of the low molecular weight polyolefin is to protect the pigment from aggregation during drying. The secondary function is to increase the melt flow of the finished product so that it can more readily let down with natural polymer in an extruder.

The amount of hydrocarbon solvent used can vary. In general, however, it will be from about 1.5 parts to about 4 parts per part of low molecular weight polyolefin.

The stated temperature range of 90–100° C. appears to be optimum for rapid and complete flushing. Flushing can be carried out, however, at lower temperatures without impairing the quality of the product. Good results have been obtained between 40 and 100° C.

The amount of pigment in the final product depends on the particle size and gravity of the pigments involved. Organic pigments with particle sizes less than 0.2 micron present relatively high surface areas to the plastic. This results in an increase in viscosity and reduction in melt flow. It has been found that when pigment concentrations are too high, these products do not let down readily in an extruder to produce a uniform final product. Such concentrations do not affect dispersion but do have a direct effect on melt flow of the dispersion with resultant poor distribution in the final product. In general, the concentration of organic pigment in the final product can vary from about 0.5% to about 50% and of inorganic pigment from about 0.5% to about 80%.

Since the above function is directly related to viscosity of the final melt, it is possible to achieve somewhat higher pigment loadings when low-viscosity materials having relatively high melt flows such as low-density polyethylene are used. The upper maximum pigment level in no way limits the effectiveness of this invention except as it influences the final mixing properties of the pigment dispersion with the natural polymer.

The low molecular weight polyolefins utilized herein are polyolefins such as polyethylene and polypropylene and/or mixtures of polyolefins having average molecular weights which will generally fall within the range from about 1,000 to about 30,000. In general, these materials are characterized by relatively low melting points, i.e., from about 100–115° C., and by a high degree of solubility in organic solvents at temperatures at or below 100° C. The preferred low molecular weight polyolefins are polyethylene and polypropylene, the polyethylene being most preferred. These low molecular weight polyolefins can be prepared by methods well known in the art.

The solvent can be any water-immiscible solvent in which the low molecular weight polyolefin is soluble. The hydrocarbon solvents such as mineral spirits, petroleum ether, V.M. and P. naphtha, kerosene, Stoddard solvent, and the like, are typical of those suitable for use herein. Halogenated hydrocarbons such as carbon tetrachloride, trichloroethylene, perchloroethylene, methylene chloride, and the like, can also be used.

The term "high molecular weight polyolefin" utilized herein is intended to cover polyolefins having average molecular weights at least above 30,000. Desirably, however, the high molecular weight polyolefins will have molecular weights considerably above this, i.e., above about 100,000. Polyethylene, polypropylene, polybutylene and other high molecular weight polyolefins can be utilized.

The term "polyolefin" as used herein is intended to cover mixtures of polyolefins, crude or refined, as well as copolymers, i.e., copolymers of ethylene and propylene, as long as such mixtures or copolymers otherwise satisfy the requirements set forth herein.

Step 3 of this invention involves dewatering, washing and drying of the nonaqueous granules to remove water and solvent. This can be accomplished by running the cooled batch through any type of conventional filtering apparatus such as a filter press. The partially dewatered granules are washed with fresh water at this point to remove residual salts. Drying is accomplished by conventional means such as tray driers, vacuum driers, etc. After drying, the material is ready for Step 4.

Step 4 of this invention involves subjecting the dried product produced in Step 3 to high shear. The product at this point contains some aggregated pigment. In order to remove this and produce a final product free of oversize material, it is necessary to subject the product to a shearing force such as a two-roll mill, or an extruder with a compounding screw. It has been found that this operation can be accomplished readily in a vented extruder with a compounding screw containing substantial metering sections before and after the venting zone. The vent is desirable to eliminate moisture, traces of solvent and entrapped air. A similar result can also be accomplished by milling the product for three minutes on a two-roll mill.

The process of the present invention is applicable to the treatment of various types of pigments, both organic and inorganic. In addition to those previously mentioned, these include benzidine yellows, rubine reds, lithols, carbon black, benzidine oranges, carbazole violet, phthalo green, and so on.

The products of the present invention may be characterized as pigment compositions comprised of pigment highly dispersed in a co-melted mixture of low molecular weight polyolefin, high molecular weight polyolefin and wetting agent.

An important advantage of the products of this invention over prior art products is in the quality of the pigment dispersions produced. Conventional dispersions of the harder colors such as carbon black, phthalocyanine blue and phthalocyanine green contain oversized material which causes frequent plugging of the screen packs in the extruder. This necessitates frequent shutdowns to change screen packs with resultant increase in cost of operation. When using the products of this invention, on the other hand, it is possible to run for hours through a 325-mesh screen pack without pressure build-up.

Excellent pigment dispersions are an absolute necessity in spin dyeing of fine denier multifilament fibers, both from the standpoint of reduced pressure build-up on the fine screen packs ordinarily used and in elimination of breakage during orientation of the yarn. Products of this invention have proved to be very satisfactory for this purpose.

An advantage of this invention from the standpoint of the process is that multicolored blends can be easily made by the blending of aqueous dispersions of the components before flushing. This insures a degree of uniformity and control that is not possible to obtain from dry color blending.

The fine dispersions obtained by this process are also very suitable for use in film. Transparency is directly related to degree of dispersion and, as a result, very bright transparent pigmented films are possible from these products. This is particularly apparent in low-density polyethylene and polypropylene. The intense transparent colors obtainable in low-density polyethylene compare favorably with dyed cellophane films, thus enabling polyethylene to compete in this area.

These products can also be advantageously used in the pigmenting of wire coatings. The degree of dispersion has a direct bearing on the electrical properties of the final coating. Desirable electrical qualities have been difficult to achieve by conventional means.

The term "surfactant" is used herein synonymously with the term "dispersant."

What we claim and desire to protect by Letters Patent is:

1. The process of preparing a pigment dispersion in a polyolefin which comprises (1) preparing an aqueous dispersion of the pigment in the presence of a material selected from the group consisting of water-soluble and water-dispersible cationic and anionic surfactants, said material being convertible to an oil-soluble, water-insoluble form, (2) mixing the aqueous dispersion thus formed with (a) a solution of low molecular weight polyolefin in an organic solvent therefor, (b) sufficient high molecular weight polyolefin to bring the pigment content to a desired level, and (c) sufficient water to dilute the pigment dispersion to a point such that adequate fluidity is maintained throughout the process, (3) adding to the resulting dispersion a material capable of reacting with said material selected from the group consisting of water-soluble and water-dispersible cationic and anionic surfactants to convert same to a water-insoluble, oil-soluble, or oil-dispersible form, (4) reacting said first-named material with said second-named material to effect conversion thereof to the water-insoluble, oil-soluble or oil-dispersible form, (5) drying the mixture, and (6) subjecting the resulting product to high shear.

2. The process of preparing a pigment dispersion in a polyolefin which comprises (1) preparing an aqueous dispersion of the pigment in the presence of a material selected from the group consisting of water-soluble and water-dispersible cationic and anionic surfactants, said material being convertible to an oil-soluble, water-insoluble form, (2) mixing the aqueous dispersion thus formed with (a) a solution of low molecular weight polyolefin in an organic solvent therefor, and (b) sufficient water to dilute the pigment dispersion to a point such that adequate fluidity is maintained throughout the process, (3) adding to the resulting dispersion a material capable of reacting with said material selected from the group consisting of water-soluble and water-dispersible cationic and anionic surfactants to convert same to a water-insoluble, oil-soluble or oil-dispersible form, (4) reacting said first-named material with said second-named material to effect conversion thereof to the water-insoluble, oil-soluble or oil-dispersible form, (5) adding sufficient high molecular weight polyolefin to bring the pigment content to a desired level, (6) drying the mixture, and (7) subjecting the resulting product to high shear.

3. The process of preparing a pigment dispersion in a polyolefin which comprises (1) preparing a aqueous dispersion of the pigment in the presence of a material selected from the group consisting of water-soluble and water-dispersible salts of cationic surfactants, said material being convertible to an oil-soluble, water-insoluble free base, (2) mixing the aqueous dispersion thus formed (a) with a solution of low molecular weight polyolefin in an organic solvent therefor, (b) sufficient high molecular weight polyolefin in powdered form to bring the pigment content to a desired level, and (c) sufficient water to dilute the pigment dispersion to a point such that adequate fluidity is maintained throughout the process, (3) adding alkali to convert said material to an oil-soluble, water-insoluble free base, (4) drying the mixture, and (5) subjecting the resulting product to high shear.

4. The process of preparing a pigment dispersion in a polyolefin which comprises (1) preparing an aqueous dispersion of the pigment in the presence of a material selected from the group consisting of water-soluble and water-dispersible salts of cationic surfactants, said material being convertible to an oil-soluble, water-insoluble free base, (2) mixing the aqueous dispersion thus formed (a) with a solution of low molecular weight polyolefin in an organic solvent therefor, and (b) sufficient water to dilute the pigment dispersion to a point such that adequate fluidity is maintained throughout the process, (3) adding alkali to convert said material to an oil-soluble, water-insoluble free base, (4) adding sufficient high molecular weight polyolefin in powdered form to bring the pigment content to a desired level, (5) drying the mixture, and (6) subjecting the resulting product to high shear.

5. The process of claim 3 in which the low molecular weight polyolefin has a molecular weight from about 1,000 to about 30,000.

6. The process of claim 5 in which the low molecular weight polyolefin is polyethylene.

7. The process of claim 5 in which the low molecular weight polyolefin is polypropylene.

8. The process of claim 3 in which the high molecular weight polyolefin has a molecular weight above about 30,000.

9. The process of claim 8 in which the high molecular weight polyolefin is low-density polyethylene.

10. The process of claim 8 in which the high molecular weight polyolefin is high-density polyethylene.

11. The process of claim 8 in which the high molecular weight polyolefin is polypropylene.

12. The process of claim 3 in which the surfactant is 1-(2-hydroxyethyl)-2-n-heptadecenyl-2-imidazoline.

13. The process of claim 3 in which the surfactant is an imidazoline.

14. The process of claim 3 in which the surfactant is an oxazoline.

15. The process of claim 3 in which the surfactant is an alkyl-substituted oxazoline.

16. The process of claim 3 in which the surfactant is a polyethoxylated amine having the structural formula

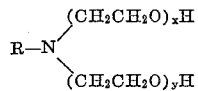

where R is an organic radical having from 12 to 20 carbon atoms, and $x$ and $y$ are integers whose sum is from 2 to about 7.

17. The process of claim 1 in which the surfactant is an anionic surfactant selected from the group consisting of sodium lauryl sulfate, dioctyl sodium sulfosuccinate, the triethanolamine salt of n-acylated polypeptide sodium n-lauryl sarcosinate and triethanol ammonium lauryl sulfate.

18. The process of claim 17 in which the anionic surfactant is sodium lauryl sulfate.

19. The process of preparing a pigment dispersion in a polyolefin which comprises (1) preparing an aqueous dispersion of the pigment in the presence of a material selected from the group consisting of water-soluble and water-dispersible salts of cationic surfactants, said material being convertible to an oil-soluble, water-insoluble free base by the addition of alkali, (2) mixing the aqueous dispersion thus formed (a) with a solution of a low molecular weight polyolefin having a molecular weight from about 1000 to about 30,000 in an organic solvent therefor, (b) sufficient high molecular weight polyolefin having a molecular weight above 100,000 in powdered form to bring the pigment content to a desired level, and (c) sufficient water to dilute the pigment dispersion to a point such that adequate fluidity is maintained throughout the process, (3) adding sodium hydroxide to convert said material to an oil-soluble, water-insoluble free base, (4) drying the mixture, and (5) subjecting the resulting product to high shear.

References Cited
UNITED STATES PATENTS

| | | | |
|---|---|---|---|
| 2,180,721 | 11/1939 | Roon et al. | 106—241 |
| 2,386,674 | 10/1945 | Flint et al. | 260—34.2 |
| 2,649,382 | 8/1953 | Vesce | 260—41 |
| 2,956,042 | 10/1960 | Underwood et al. | 260—897 |
| 3,088,837 | 5/1963 | Prescott et al. | 106—308 |

MORRIS LIEBMAN, *Primary Examiner.*

L. T. JACOBS, *Assistant Examiner.*

UNITED STATES PATENT OFFICE
CERTIFICATE OF CORRECTION

Patent No. 3,360,497                      December 26, 1967

George F. Jones et al.

It is hereby certified that error appears in the above numbered patent requiring correction and that the said Letters Patent should read as corrected below.

Column 12, lines 47 and 63, and column 14, line 12, for "(a) with", each occurrence, read -- with (a) --.

Signed and sealed this 21st day of January 1969.

(SEAL)
Attest:

Edward M. Fletcher, Jr.
Attesting Officer

EDWARD J. BRENNER
Commissioner of Patents